(12) United States Patent
Nguyen et al.

(10) Patent No.: US 8,372,271 B2
(45) Date of Patent: *Feb. 12, 2013

(54) ADDITIVES TO ENHANCE METAL AND AMINE REMOVAL IN REFINERY DESALTING PROCESSES

(75) Inventors: Tran M. Nguyen, Sugar Land, TX (US); Lawrence N. Kremer, Sugar Land, TX (US); Jerry J. Weers, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 848 days.

This patent is subject to a terminal disclaimer.

(21) Appl. No.: 12/390,631

(22) Filed: Feb. 23, 2009

(65) Prior Publication Data

US 2009/0152164 A1 Jun. 18, 2009

Related U.S. Application Data

(62) Division of application No. 10/649,921, filed on Aug. 27, 2003, now Pat. No. 7,497,943.

(60) Provisional application No. 60/407,139, filed on Aug. 30, 2002.

(51) Int. Cl.
*C10G 17/04* (2006.01)
(52) U.S. Cl. ............... 208/252; 208/251 R; 208/254 R
(58) Field of Classification Search .............. 208/251 R, 208/252, 254 R
See application file for complete search history.

(56) References Cited

U.S. PATENT DOCUMENTS

| | | | |
|---|---|---|---|
| 2,175,095 A | 10/1939 | Stoesser | |
| 2,355,077 A | 8/1944 | Johnson | |
| 2,744,853 A | 5/1956 | Kavanagh et al. | |
| 2,767,123 A | 10/1956 | Hickok et al. | |
| 2,778,777 A | 1/1957 | Powell | |
| 3,023,160 A | 2/1962 | Stedman | |
| 3,150,081 A | 9/1964 | Haslam | |
| 3,167,500 A | 1/1965 | Payne | |

(Continued)

FOREIGN PATENT DOCUMENTS

| | | |
|---|---|---|
| JP | S421992 | 1/1967 |
| JP | S6032888 | 2/1985 |

(Continued)

OTHER PUBLICATIONS

PCT International Search Report for International Application No. PCT/US02/27116, Dec. 23, 2003.

(Continued)

*Primary Examiner* — Walter D Griffin
*Assistant Examiner* — Renee E Robinson
(74) *Attorney, Agent, or Firm* — Mossman Kumar & Tyler PC

(57) ABSTRACT

It has been discovered that metals and/or amines can be removed or transferred from a hydrocarbon phase to a water phase in an emulsion breaking process by using a composition that contains water-soluble hydroxyacids. Suitable water-soluble hydroxyacids include, but are not necessarily limited to glycolic acid, gluconic acid, $C_2$-$C_4$ alpha-hydroxy acids, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof. The composition may also include at least one mineral acid to reduce the pH of the desalter wash water. A solvent may be optionally included in the composition. The invention permits transfer of metals and/or amines into the aqueous phase with little or no hydrocarbon phase undercarry into the aqueous phase. The composition is particularly useful in treating crude oil emulsions, and in removing calcium and other metals therefrom.

15 Claims, 1 Drawing Sheet

U.S. PATENT DOCUMENTS

| | | | |
|---|---|---|---|
| 3,322,664 A | 5/1967 | Paterson et al. |
| 3,449,243 A | 6/1969 | Strong, Jr. et al. |
| 3,582,489 A | 6/1971 | Meadow et al. |
| 4,164,472 A | 8/1979 | Cheng et al. |
| 4,167,214 A | 9/1979 | Street, Jr. |
| 4,276,185 A | 6/1981 | Martin |
| 4,342,657 A | 8/1982 | Blair, Jr. |
| 4,432,865 A | 2/1984 | Norman |
| 4,439,345 A | 3/1984 | Duke |
| 4,587,005 A | 5/1986 | Siskin et al. |
| 4,645,589 A | 2/1987 | Krambeck et al. |
| 4,778,589 A | 10/1988 | Reynolds |
| 4,778,590 A | 10/1988 | Reynolds et al. |
| 4,778,591 A | 10/1988 | Reynolds |
| 4,778,592 A | 10/1988 | Reynolds |
| 4,789,463 A | 12/1988 | Reynolds |
| 4,818,410 A | 4/1989 | Bellos et al. |
| 4,853,109 A | 8/1989 | Reynolds |
| 4,938,876 A | 7/1990 | Ohsol |
| 4,988,433 A | 1/1991 | Reynolds et al. |
| 4,992,210 A | 2/1991 | Naeger et al. |
| 5,062,992 A | 11/1991 | McCullough |
| 5,078,858 A | 1/1992 | Hart et al. |
| 5,080,779 A | 1/1992 | Awbrey et al. |
| 5,104,578 A | 4/1992 | McCullough |
| 5,114,566 A | 5/1992 | Naeger et al. |
| 5,174,957 A | 12/1992 | McCullough |
| 5,176,847 A | 1/1993 | Kremer |
| 5,282,959 A | 2/1994 | Roling et al. |
| 5,346,627 A | 9/1994 | Siefert et al. |
| 5,364,532 A | 11/1994 | Bellos et al. |
| 5,389,594 A | 2/1995 | Crump et al. |
| 5,395,536 A | 3/1995 | Brown et al. |
| 5,637,223 A | 6/1997 | Bellos et al. |
| 5,853,592 A | 12/1998 | Bellos et al. |
| 5,948,242 A | 9/1999 | Ohsol et al. |
| 6,039,865 A | 3/2000 | Mesher |
| 6,133,205 A | 10/2000 | Jones |

FOREIGN PATENT DOCUMENTS

| | | | |
|---|---|---|---|
| RU | 1666520 A1 | | 8/1989 |
| WO | 0052114 A1 | | 9/2000 |
| WO | WO 01/40410 | * | 7/2001 |

OTHER PUBLICATIONS

J. Weers, et al., "A New Metals Removal Process for Doba Crude Oil," ERTC 9th Annual Meeting, Prague, Czech Republic, Nov. 15, 2004.

J.J. Weers et al., "Calcium Removal from High TAN Crudes," Petroleum Technology Quarterly, Q3, 2005, avilalbe from www.eptq.com.

Baker Petrolite, "Remove Metals, Improve Margins," EXCALIBUR brochure, 2005.

Plaintiff's First Amended Complaint and Application for Preliminary Injunction.

Defendant Nalco company's Response to Plaintiff's Application for a Preliminary Injunction.

Plaintiff's Reply to Defendant Nalco Company's Response to Plaintiff's Application for Preliminary Injunction.

Nalco Company's Second Amended Answer to First Amended Complaint.

Amended Memorandum Opinion and Order for Injunctive Relief.

Plaintiff's Answer to Defendant's Second Amended Counterclaims.

J. H. Gary, et al., Petroleum Refining: Technology and Economics, 3rd Edition, Chapter 4, Crude Distillation, 1994, pp. 39-69, Marcel Dekker, Inc. New York.

* cited by examiner

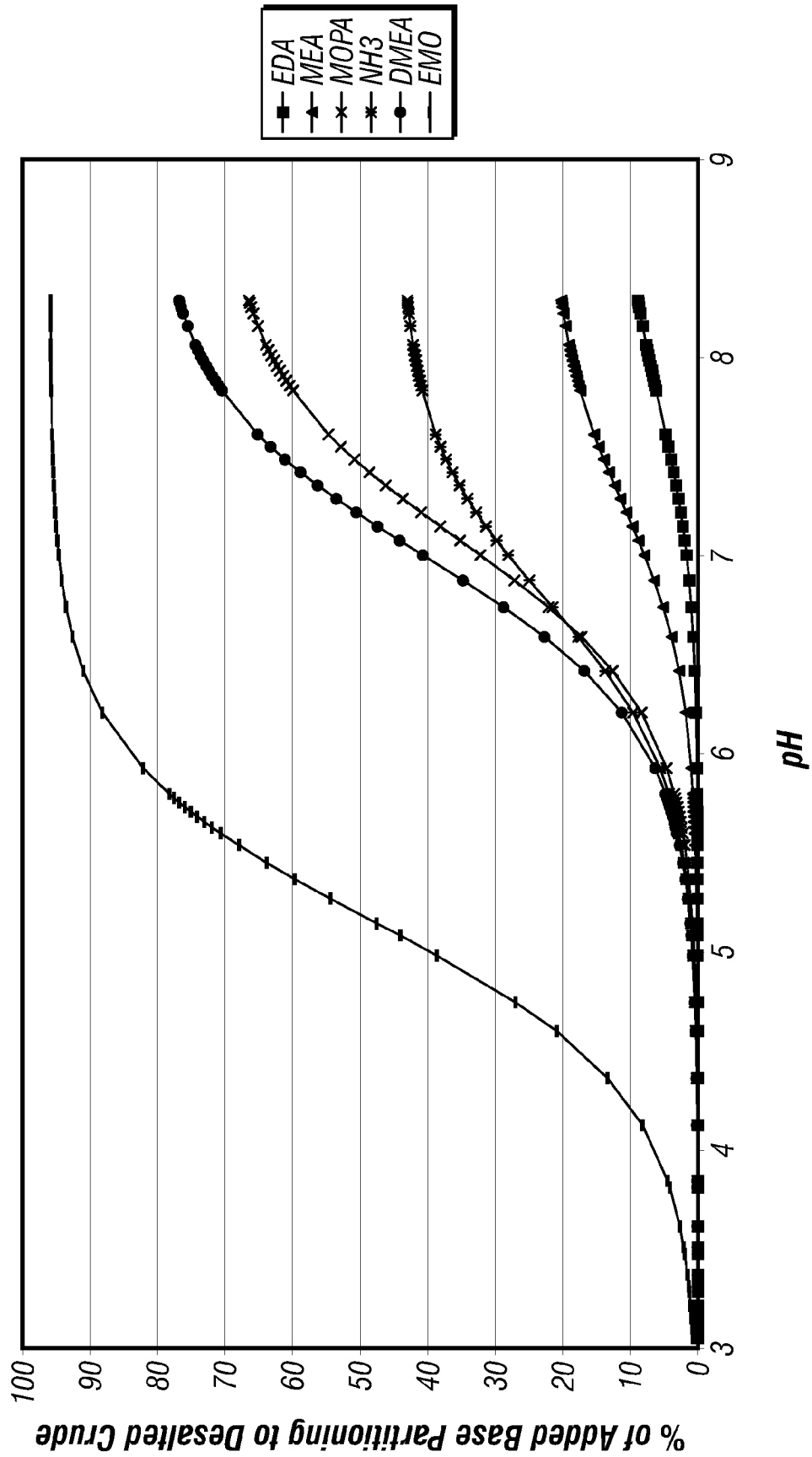

US 8,372,271 B2

ADDITIVES TO ENHANCE METAL AND AMINE REMOVAL IN REFINERY DESALTING PROCESSES

CROSS-REFERENCE TO RELATED APPLICATIONS

This application is a divisional application of U.S. patent application Ser. No. 10/649,921 filed Aug. 27, 2003, issued as U.S. Pat. No. 7,497,943 on Mar. 3, 2009, which in turn claims the benefit of U.S. Provisional Application No. 60/407,139 filed Aug. 30, 2002.

TECHNICAL FIELD

The present invention relates to methods and compositions for separating emulsions of hydrocarbons and water, and more particularly relates, in one embodiment, to methods and compositions for transferring metals and/or amines to an aqueous phase in an emulsion breaking process.

BACKGROUND

In an oil refinery, the desalting of crude oil has been practiced for many years. The crude is usually contaminated from several sources, including, but not necessarily limited to:
  Brine contamination in the crude oil as a result of the brine associated with the oil in the ground;
  Minerals, clay, silt, and sand from the formation around the oil well bore;
  Metals including calcium, zinc, silicon, nickel, sodium, potassium, etc.;
  Nitrogen-containing compounds such as amines used to scrub $H_2S$ from refinery gas streams in amine units, or from amines used as neutralizers in crude unit overhead systems, and also from $H_2S$ scavengers used in the oilfield; and
  Iron sulfides and iron oxides resulting from pipeline and vessel corrosion during production, transport, and storage.

Desalting is necessary prior to further processing to remove these salts and other inorganic materials that would otherwise cause fouling and deposits in downstream heat exchanger equipment and/or form corrosive salts detrimental to crude oil processing equipment. Further, these metals can act as poisons for the catalysts used in downstream refinery units. Effective crude oil desalting can help minimize the effects of these contaminants on the crude unit and downstream operations. Proper desalter operations provide the following benefits to the refiner:
  Reduced crude unit corrosion.
  Reduced crude preheat system fouling.
  Reduced potential for distillation column damage.
  Reduced energy costs.
  Reduced downstream process and product contamination.

Desalting is the resolution of the natural emulsion of water that accompanies the crude oil by creating another emulsion in which about 5 percent relative wash water is dispersed into the oil using a mix valve. The emulsion mix is directed into a desalter vessel containing a parallel series of electrically charged plates. Under this arrangement, the oil and water emulsion is exposed to the applied electrical field. An induced dipole is formed on each water droplet within the emulsion that causes electrostatic attraction and coalescence of the water droplets into larger and larger droplets. Eventually, the emulsion resolves into two separate phases—the oil phase (top layer) and the water phase (bottom layer). The streams of desalted crude oil and effluent water are separately discharged from the desalter.

The entire desalting process is a continuous flow procedure as opposed to a batch process. Normally, chemical additives are injected before the mix valve to help resolve the oil/water emulsion in addition to the use of electrostatic coalescence. These additives effectively allow small water droplets to more easily coalesce by lowering the oil/water interfacial tension.

Crude oil that contains a high percent of particulate solids can complicate the desalting process. The particulate solids, by nature, would prefer to transfer to the water phase. However, much of the solids in a crude oil from a field exists in tight water-in-oil emulsions. That is, oil-wetted solids in high concentration in the crude may help form tight oil and water emulsions that are difficult to resolve. These tight emulsions are often referred to as "rag" and may exist as a layer between the separated oil and water phases. The rag layer inside the desalter vessel may grow to such an extent that some of it will be inadvertently discharged with the water phase. This is a problem for the waste water treatment plant since the rag layer still contains a high percentage of unresolved emulsified oil.

As mentioned, much of the solids encountered during crude oil desalting consists of iron, most commonly as particulate iron such as iron oxide, iron sulfide, etc. Other metals that are desirably removed include, but are not necessarily limited to, calcium, zinc, silicon, nickel, sodium, potassium, and the like, and typically a number of these metals are present. Some of the metals may be present in a soluble form. The metals may be present in inorganic or organic forms. In addition to complicating the desalter operation, iron and other metals are of particular concern to further downstream processing. This includes the coking operation since iron and other metals remaining in the processed hydrocarbon yields a lower grade of coke. Removing the metals from the crude oil early in the hydrocarbon processing stages is desired to eventually yield high quality coke as well as to limit corrosion and fouling processing problems.

Several treatment approaches have been made to reduce total metal levels and these all center on the removal of metals at the desalter unit. Normally, the desalter only removes water soluble inorganic salts such as sodium or potassium chlorides. Some crude oils contain water insoluble metal organic acid salts such as calcium naphthenante and iron naphthenate, which are soluble or dispersed as fine particulate matter in the oil but not in water.

It would thus be desirable to develop a composition and method employing it that would cause most or all of the metals in the crude oil to transfer from the oil phase in a desalter operation, with little or no oil carryunder in the aqueous phase. Nonyl phenol resins have been used as desalting additives in the past, but these materials have come under suspicion as possible hormonal mimics and are ineffective by themselves of removing metals such as calcium or iron.

SUMMARY

Accordingly, it is an object of the present invention to provide a composition and method of using it that would transfer a large part of the metals and/or amines in the crude oil to the aqueous phase in a desalter operation.

It is another object of the present invention to provide a composition and method for transferring metals and/or amines from a hydrocarbon into an aqueous phase in an emulsion breaking operation without causing oil undercarry into the aqueous phase.

In carrying out these and other objects of the invention, there is provided, in one form, a method of transferring metals and/or amines from a hydrocarbon phase to a water phase involving adding to an emulsion of hydrocarbon and water, an effective amount of a composition to transfer metals and/or amines from a hydrocarbon phase to a water phase containing at least one water-soluble hydroxyacid. The water-soluble hydroxyacid may be glycolic acid, gluconic acid, $C_2$-$C_4$ alpha-hydroxy acids, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof. The emulsion is then resolved into hydrocarbon phase and an aqueous phase, where at least a portion of the metals and/or amines have been transferred to the aqueous phase. This is accomplished by converting the water insoluble salt such as calcium naphthenate into a water soluble salt such as calcium glycolate.

In another non-limiting embodiment of the invention, there is provided a composition for transferring metals and/or amines from a hydrocarbon phase to a water phase that includes a water-soluble hydroxyacid (as defined above, including the salts thereof), and a mineral acid.

There is provided in another non-limiting embodiment of the invention a composition for transferring metals and/or amines from a hydrocarbon phase to a water phase that includes a water-soluble hydroxyacid (as defined above, including the salts thereof) and at least one additional component that may be a hydrocarbon solvent, a corrosion inhibitor, a demulsifier, a scale inhibitor, metal chelants, wetting agents and mixtures thereof.

In still another non-limiting embodiment of the invention, there is provided a treated hydrocarbon emulsion that includes hydrocarbon, water, and a composition for transferring metals and/or amines from a hydrocarbon phase to a water phase comprising a water-soluble hydroxyacid (as defined above, including the salts thereof).

BRIEF DESCRIPTION OF THE DRAWING

The FIGURE is a graph of various amines and ammonia partitioning across desalters as a function of pH.

DETAILED DESCRIPTION

The inventors have discovered that the addition of glycolic acid (hydroxyacetic acid) and other water-soluble hydroxyacids to a crude oil can significantly reduce the amount of calcium and other metals and/or amines in the hydrocarbon when it is run through a desalter in a refinery. The inventors have compared the "normal" desalting on a reference crude oil containing higher than normal amounts of calcium and found minimal calcium removal. The addition of glycolic acid in levels of up to a 5:1 ratio with calcium, results in much lower metals and/or amine content of the desalted oil. The levels of metals other than calcium such as iron, zinc, silicon, nickel, sodium and potassium are also reduced. The removal of particulate iron in the form of iron oxide, iron sulfide, etc. is a specific, non-limiting embodiment of the invention. By "removing" the metals and/or amines from the hydrocarbon or crude is meant any and all partitioning, sequestering, separating, transferring, eliminating, dividing, removing, of one or more metal from the hydrocarbon or crude to any extent.

Being an aqueous additive, the glycolic acid is typically added to the wash water in the desalter. This improves distribution of the acid in the oil although addition to the aqueous phase should not be viewed as a requirement for the composition of the invention to work.

The composition and method of the invention will be valuable to produce high quality (i.e., high purity) coke from crude that may originally have contained high concentrations of metals and/or amines and solids, including iron-based solids. Further, the invention advances the technology by removing inorganic material from the crude oil without discharging any oil or emulsion to the waste treatment plant.

In this invention, it will be understood that the metals include, but are not necessarily limited to, those of Groups IA, IIA, VB, VIII, IIB and IVA of the Periodic Table (CAS version). In another non-limiting embodiment, the metals include, but are not necessarily limited to calcium, iron, zinc, silicon, nickel, sodium, potassium, vanadium, and combinations thereof. In particular, nickel and vanadium are known poisons for catalysts used in fluid catalytic cracking units (FCCUs) downstream.

The amines removed in accordance with the method of this invention may include, but are not necessarily limited to, monoethanolamine (MEA); diethanolamine (DEA); triethanolamine (TEA); N-methylethanolamine; N,N-dimethylethanolamine (DMEA); morpholine; N-methyl morpholine; ethylenediamine (EDA); methoxypropylamine (MOPA); N-ethyl morpholine (EMO); N-methyl ethanolamine, N-methyldiethanolamine and combinations thereof.

In one embodiment of the invention, the composition of the invention includes a water-soluble hydroxy acid. Hydroxy acids are defined herein as not including or exclusive of acetic acid. Acetic acid has sometimes been used to remove metals as well, but it has a high oil solubility and tends to stay with the hydrocarbon coming from the desalter. The acidity of the acetic acid can then cause corrosion problems in the crude unit. The water-soluble hydroxy acids are much more water-soluble and will not partition as much into the crude oil, thus reducing downstream concerns. They are also less volatile and do not distill into the crude unit overhead system where they can increase corrosion rates when combined with the water usually present at this location.

In one preferred, non-limiting embodiment of the invention, the water-soluble hydroxyacid is selected from the group consisting of glycolic acid, $C_1$-$C_4$ alpha-hydroxy acids, poly-hydroxy carboxylic acids, thioglycolic acid, chloroacetic acid, polymeric forms of the above hydroxyacids, glycolate ethers, poly-glycolic esters, and mixtures thereof. While thioglycolic acid and chloroacetic acid are not strictly speaking hydroxyacids, they are functional equivalents thereof. For the purposes of this invention, they are defined as hydroxyacids. The alpha substituent on the $C_1$-$C_4$ alpha-hydroxy acids may be any $C_1$-$C_4$ straight or branched alkyl group. In one non-limiting embodiment of the invention, the alpha substituent may be $C_2$-$C_4$ straight or branched alkyl group and lactic acid is not included. Gluconic acid, $CH_2OH(CHOH)_4COOH$, is a non-limiting but preferred polymer of glycolic acid. The glycolate ethers may have the formula:

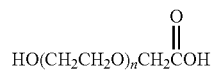

where n ranges from 1-10. The glycolate esters may have a formula:

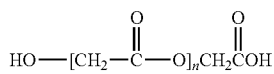

where n is as above. Thioglycolic acid and the ethers of glycolic acid may have the added benefits of a higher boiling point, and possibly increased water solubility. A higher boiling point means the additive will not distill into the distillate fractions in the crude unit and cause corrosion or product quality concerns. The higher water solubility also favors removal of the additive from the crude in the desalter and reduces the amount that may reach the downstream processing units.

In particular, the definition of water-soluble hydroxyacids includes ammonium salt and alkali metal salts (e.g. sodium and potassium salts, etc.) of these hydroxyacids alone or in combination with the other water-soluble hydroxyacids mentioned. Such salts would be formed in the desalter wash water as the system's pH was adjusted with pH adjusters such as sodium hydroxide, potassium hydroxyide, ammonia, and the like.

In another non-limiting embodiment the water-soluble hydroxyacids do not include citric acid, malic acid, tartaric acid, mandelic acid, and lactic acid. In yet another non-limiting embodiment of the invention, the definition of water-soluble hydroxyacids does not include organic acid anhydrides, particularly acetic, propionic, butyric, valeric, stearic, phthalic and benzoic anhydrides.

In yet another non-limiting embodiment of the invention, glycolic acid and gluconic acid may be used to remove calcium and amines, and thioglycolic acid may be used for iron removal, from crude oil or another hydrocarbon phase.

It is expected that the water-soluble hydroxyacids will be used together with other additives including, but not necessarily limited to, corrosion inhibitors, demulsifiers, pH adjusters, metal chelants, scale inhibitors, hydrocarbon solvents, and mixtures thereof, in a commercial process. Metal chelants are compounds that complex with metals to form chelates. In particular, mineral acids may be used since metal removal is best accomplished at an acidic pH. The use of combinations of water-soluble hydroxyacids, particularly glycolic acid or gluconic acid, and mineral acids may give the best economics in a commercial application. Suitable mineral acids for use in conjunction with the water-soluble hydroxyacids of this invention include, but are not necessarily limited to, sulfuric acid, hydrochloric acid, phosphoric acid, nitric acid, phosphorous acid, and mixtures thereof. As noted, in one embodiment of the invention, the method of this invention is practiced in a refinery desalting process that involves washing the crude emulsion with wash water. In one non-limiting embodiment of the invention, the amount of mineral acid used may be sufficient to lower the pH of the wash water to 6 or below. As noted below, in some embodiments of the invention, it may be necessary or preferred to lower the pH of the wash water to 5 or below, alternatively to 4 or below. The water-soluble hydroxyacids (and salts thereof) are expected to be useful over a wide pH range, although in some situations it may be necessary or desirable to adjust the pH to achieve the desired contaminant transfer or separation.

It will be appreciated that the necessary, effective or desired proportions of the hydroxyacid and/or the mineral acid will be difficult to predict in advance, since these proportions or dosages are dependent upon a number of factors, including, but not necessarily limited to, the nature of the hydrocarbon, the concentration of metal species and amine to be removed, the temperature and pressure conditions of method, the particular hydroxyacid and mineral acid used, etc. In general, the more of a species, such as calcium, there is to be removed, the more of the reactive acid that must be added. Since many undesirable species are affected, a successful metal removal process may require more reactive acid on a stoichiometric basis than would be indicated by the concentration of only the target species. It may therefore be insufficient to only just add enough acid to get the pH below 6. Nevertheless, in order to give some sense of the proportions that may be used, in one non-limiting embodiment of the invention, the composition may comprise down to about 1 wt. % water-soluble hydroxyacid; and up to about 20 wt. % mineral acid, preferably from about 1 to about 100 wt. % water-soluble hydroxyacid; and from about 1 to about 20 wt. % mineral acid, and most preferably from about 25 to about 85 wt. % water-soluble hydroxyacid; and from about 15 to about 75 wt. % mineral acid. In some non-limiting embodiments of the invention, the mineral acid is optional and may be omitted.

The additive blend of this invention is injected into the wash water before the mix valve in neat form or diluted with water, alcohol or similar solvent suitable to keep all additive components in solution. The amount of solvent used may range from about 10 to about 95 wt. %, based on the total composition, preferably from about 20 to about 10 wt. %.

The concentration of the additive blend composition of this invention to be used in the crude oil to be effective is very difficult to predict in advance since it depends on multiple, interrelated factors including, but not limited to, the composition of the crude, the desalting conditions (temperature, pressure, etc.), the flow rate of the crude and its residence time in the desalter, among others. Nevertheless, for the purposes of non-limiting illustration, the proportion of the active water-soluble hydroxyacid that may be used in the crude (not including any solvent or mineral acid) may range from about 1 to about 2000 ppm-w, more preferably from about 10 to about 500 ppm-w and will depend on the concentration of metal species to be removed. The organic hydroxy acid reacts stoichiometrically with the organo metal and/or amine species to be removed. Thus an equivalent amount of organic hydroxy acid must be added compared to the concentration of metal species to be removed. A slight excess of the acid will ensure that the reaction goes to completion. In one non-limiting embodiment of the invention, the amount of water-soluble hydroxyacid is stoichiometric with the amount of metals and/or amines present, or greater than stoichiometric. For economic reasons the refinery may chose to leave some of the metal and/or amine species in the crude at an acceptably low level of contamination of hydrocarbon. In those cases the treatment level of the hydroxy acids can be correspondingly reduced.

It is most preferred, of course, that in the practice of this invention there be no oil carryunder in the aqueous phase, and that at least oil carryunder is minimized. Further, while it is preferred that all of the metals and/or amines transfer to the aqueous phase, in one non-limiting theory of the invention, some of the metals and/or amines may be transferred from the oil phase into the rag. This proportion of metals and/or amines is then removed when the rag is cleaned out.

It is also most preferred, of course, that in the practice of this invention all of the metals and/or amines transfer to the aqueous phase. In another non-limiting embodiment of the invention, 25% or less metal and/or amine is present in the hydrocarbon phase after desalting, preferably 20% or less metal and/or amine remains, most preferably only 10% or less remains. In some cases the refinery may chose to leave higher percentages of metal and/or amine contaminants in the crude if the detrimental effects are judged to be economically acceptable.

The invention will be illustrated further with reference to the following Examples, which are not intended to limit the invention, but instead illuminate it further.

The following Electrostatic Desalting Dehydration Apparatus (EDDA) Test Method was employed to screen possible blend compositions. The EDDA is a laboratory test device to simulate the desalting process.

EDDA TEST METHOD

1. Add 800, 600 or 400 ml of crude oil to be tested minus the percent of wash water (depending on the number of tubes the EDDA will hold) to a Waring blender.
2. Add the required percentage of wash water to the blender to bring the total volume up to 800, 600 or 400 ml.
3. Mix at 50% speed (on the Variac) for 30 seconds. The speed can be reduced if the ΔP on the mix valve is low.
4. Pour the mixture into the EDDA tubes to just below the 100 ml line.
5. Place the tubes in the EDDA heating block that is at the desired test temperature (99° C.).
6. Add the desired quantity of demulsifier, in ppm, to each tube. With every test, a blank must be run for comparison purposes.
7. Place the screw top electrode in the tubes and allow the samples to heat for approximately 15 minutes.
8. Tighten the caps and shake each tube 100-200 times and place back in the heating block to reheat for five minutes.
9. Place the electrode cover over the tubes and lock into place. Make sure that there is good contact between the cover and the electrode caps.
10. Set the time for five minutes and run at 1500-3000 volts, depending on the test requirements.
11. At the end of the five minutes, pull the tubes out and check for the percent water drop. Also check the quality of the interface and the quality of the water and record it.
12. Repeat steps 9, 10, and 11 until the desired total residence time is achieved.
13. Determine the best candidates and run a dehydration test on those samples.
   a) Fill the desired number of 12.5 ml centrifuge tubes to the 50% mark with xylene.
   b) Use a glass syringe to pull 5.8 ml of dehydrated crude sample from the desired level in the tube and mix in with the xylene in the centrifuge tubes.
   c) Centrifuge the tubes at 2000 rpm for 4 minutes.
   d) Check for the quantity of water, emulsion, and solids that are present in the bottom of the tube and record.

ANALYSIS FOR CALCIUM

After completing the EDDA test, use a glass syringe and cannula (long, wide bore needle), to withdraw two 20 ml aliquots of the EDDA desalted crude oil. Abstract the oil at a level in the EDDA tube that is at 25 ml and 70 ml below the surface of the oil. The two samples (top cut and bottom cut) are each analyzed for calcium concentration by whatever appropriate method (wet ash or microwave digestion, acidification, dilution, AA or ICP analysis). A similar procedure would be used to generate oil and water samples that could be analyzed by ion chromatography for other contaminants such as amine salts.

The crude oil used was from an African country that has a high calcium content.

Additive A=70% glycolic acid, balance water.

Additive B=A blend of glycolic acid, phosphoric acid (pH adjuster), a pyridine quaternary ammonium compound (corrosion inhibitor), a dinonyl phenol/ethylene oxide oxyalkylate (co-solvent), isopropyl alcohol and water.

TABLE I

Sample A - 100% Crude

| | | | Desalted Crude Oil* | | |
|---|---|---|---|---|---|
| Ex. | Metal | Additive | Raw Crude Oil, ppm | Top Phase, ppm | Interface, ppm | Water Phase, ppm |
| 1 | Calcium | A | 370 | 30 | 31 | 1700 |
| 2 | " | B | 370 | 76 | 76 | 1210 |
| 3 | Iron | A | 60 | 14 | 15 | 113 |
| 4 | " | B | 60 | 26 | 27 | 8 |
| 5 | Zinc | A | 35 | 6 | 4 | 163 |
| 6 | " | B | 35 | 17 | 16 | 34 |
| 7 | Silicon | A | 37 | <2 | <2 | 6 |
| 8 | " | B | 37 | <2 | 2 | 7 |
| 9 | Nickel | A | 8 | 9 | 9 | <2 |
| 10 | " | B | 8 | 9 | 10 | <2 |
| 11 | Sodium | A | 97 | 9 | 10 | 416 |
| 12 | " | B | 97 | 13 | 12 | 404 |
| 13 | Potassium | A | 789 | 31 | 32 | 4030 |
| 14 | " | B | 789 | 34 | 32 | 3900 |

*Top Phase = 20 mL sample taken at 75 mL mark of 100 mL EDDA test tube. Interface = 20 mL oil sample taken near oil/water interface present in EDDA test tube.

TABLE II

Sample B - 20% High Calcium Crude Blend

| | | | Desalted Crude Oil | | |
|---|---|---|---|---|---|
| Ex. | Metal | Additive | Raw Crude Oil, ppm | Top Phase, ppm | Interface, ppm | Water Phase, ppm |
| 15 | Calcium | A | Emulsion | Emulsion | Emulsion | Emulsion |
| 16 | " | B | 58 | 8 | 5 | 362 |
| 17 | Iron | A | Emulsion | Emulsion | Emulsion | Emulsion |
| 18 | " | B | 10 | 2 | <2 | 3.6 |
| 19 | Zinc | A | Emulsion | Emulsion | Emulsion | Emulsion |
| 20 | " | B | 6 | 5 | 22 | 32 |
| 21 | Silicon | A | Emulsion | Emulsion | Emulsion | Emulsion |
| 22 | " | B | <2 | 11 | 20 | 2 |
| 23 | Nickel | A | Emulsion | Emulsion | Emulsion | Emulsion |
| 24 | " | B | 2 | 3 | 3 | <2 |
| 25 | Sodium | A | Emulsion | Emulsion | Emulsion | Emulsion |
| 26 | " | B | 17 | 15 | 8 | 113 |
| 27 | Potassium | A | Emulsion | Emulsion | Emulsion | Emulsion |
| 28 | " | B | 79 | 3 | 4 | 91 |

From the data presented above it may be seen that the water-soluble hydroxyacid used (glycolic acid) effectively removed or transferred a variety of metals from the oil phase to the water phase. The inventive method was particularly effective on the high content metals such as calcium and potassium.

Tables III-VI provide additional data showing the transfer of various metals from a hydrocarbon phase to a water phase using the water-soluble hydroxyacids of the invention. The various components are defined as follows (all proportions are volume percents):

Additive C 70% glycolic acid, 30% water

Additive D 75% Additive C, 20% acrylic acid polymer scale inhibitor (which alone is designated SI1), 1.8% alkyl pyridine quaternary ammonium salt corrosion inhibitor, and 3.2% oxyalkylated alkyl phenol surfactant.

Additive E 72% phosphorous acid scale control/pH adjuster compound, 14% oxyalkylated polyalkyleneamine, and 14% SI1.

Additive F 10% oxalic acid, 20% thioglycolic acid, 10% glycolic acid, 1.5% alkyl pyridine quaternary ammonium salt corrosion inhibitor, and 58.5% water.

DA through DF designate Demulsifiers A through F, which are all various oxyalkylated alkylphenol resin demulsifiers. When used together with an additive of this invention, they may be abbreviated such as DA/D which indicates Demulsifier A is used together with Additive D in the ppm ratio given in the next column.

SI2 Scale Inhibitor 2 that contains diammonium ethylenediamine tetracetic acid (EDTA).

SI3 Scale Inhibitor 3 that contains an amine phosphonate scale inhibitor.

SRA1 Scale Removal Additive 1, which is a blend of an alkyl pyridine quaternary ammonium salt corrosion inhibitor (same as in Additive D) with phosphoric acid, glycolic acid and a demulsifier.

TABLE III

EDDA Test Results, Examples 29-40

| Ex | Test Condition | Test Sample | Additive | Dose (ppm) | | Metals Analysis | | | | | | | |
|---|---|---|---|---|---|---|---|---|---|---|---|---|---|
| | | | | | | Na | K | Mg | Ca | Fe | Cu | Zn | Al |
| 29 | EDDA. 10% DI Wash Water | Crude A | C | 1000 (in water) | Top Oil Interface Water | 2.3 2.5 443 | 11.5 8.5 4400 | <1 <1 21.9 | 85 68 1560 | 51 40 2.7 | <2 <2 <0.1 | 40.0 31.0 3.7 | 1.5 1.0 0.3 |
| 30 | EDDA. 10% DI Wash Water | " | lactic acid | 1000 (in water) | Top Oil Interface Water | 2.4 1 388 | 6.3 6.5 4170 | <1 <1 22.1 | 37 37 1610 | 39 38 5.5 | <2 <2 <0.1 | 30.0 30.0 9.9 | 1.2 1.1 0.5 |
| 31 | EDDA. 10% DI Wash Water | " | Blank | none | Oil | 164 | 765 | 4 | 306 | 49 | <2 | 30.0 | 8.0 |
| 32 | EDDA. 10% DI Wash Water | " | C | 2000 (in water) | | 5 5 425 | 19 20 4670 | <3 <3 24 | 24 24 1640 | 16 16 93.8 | <0.5 <0.5 0.2 | 2.0 2.0 162.0 | 1.2 1.0 1.5 |
| 33 | | | Blank | None | Oil | 87 | 919 | 5.8 | 363 | 68.6 | <0.5 | 32.0 | 11.4 |
| 34 | EDDA. 10% DI Wash Water | " | SRA1 | 2000 (in water) | Top Oil Interface Water | 13 12 404 | 34 32 3900 | 21 | 76 76 1210 | 26 27 8 | | 17.0 16.0 34.0 | |
| 35 | EDDA. 10% DI Wash Water | " | SI2 | 2000 (in water) | Top Oil Interface Water | 11 7 414 | 14 10 4000 | 20 | 192 191 959 | 29 28 82 | | 7.0 2.0 164.0 | |
| 36 | EDDA. 10% DI Wash Water | " | C | 2000 (in water) | Top Oil Interface Water | 9 10 416 | 31 32 4030 | 22 | 30 31 1700 | 14 15 113 | | 6.0 4.0 163.0 | 2.0 |
| 37 | EDDA. 10% DI Wash Water | " | SI3 | 2000 (in water) | Top Oil Interface Water | 15 15 440 | 60 60 4190 | | 276 281 538 | 49 51 | | 38.0 39.0 | |
| 38 | EDDA. 10% DI Wash Water | " | Blank | none | Oil | 97 | 789 | 4 | 370 | 60 | | 35.0 | 8.0 |
| 39 | EDDA. 10% DI Wash Water | " | SRA1 | 2000 (in water) | Top Oil Interface Water | 15 8 113 | 3 4 91 | 6 | 8 5 362 | 2 3.6 | | 5.0 22.0 32.0 | |
| 40 | EDDA. 10% DI Wash Water | " | Blank | none | Oil | 17 | 79 | | 58 | 10 | | 6.0 | |

| Ex | Test Condition | Test Sample | Additive | Dose (ppm) | | Metals Analysis | | | | | | | |
|---|---|---|---|---|---|---|---|---|---|---|---|---|---|
| | | | | | | Sb | Ba | V | Pb | Mn | Ni | Si | P |
| 29 | EDDA. 10% DI Wash Water | Crude A | C | 1000 (in water) | Top Oil Interface Water | 15 15 <0.1 | 2.7 2.4 30.4 | <1 <1 <0.1 | 8 8 0.6 | 10 8 18.2 | 10.0 8.0 0.2 | 1.3 <1 5.5 | 8 8 <0.1 |
| 30 | EDDA. 10% DI Wash Water | " | lactic acid | 1000 (in water) | Top Oil Interface Water | 14 20 <0.1 | 2.4 2.2 32.3 | <1 <1 <0.1 | 7 10 0.6 | 6 6 29.4 | 8.0 8.0 0.3 | <1 <1 5.3 | 7 11 0.1 |
| 31 | EDDA. 10% DI Wash Water | " | Blank | none | Oil | 14 | 8.5 | <1 | 8 | 11 | 7.0 | 10 | 8 |
| 32 | EDDA. 10% DI Wash Water | " | C | 2000 (in water) | | <0.5 <0.5 0.4 | 0.7 0.7 33.8 | <0.5 <0.5 0.2 | 11.7 7.9 3.1 | 0.6 0.6 56.4 | 8.6 9.0 1.0 | 30.7 7.1 5.5 | <2 <2 2.2 |
| 33 | | | Blank | None | Oil | <0.5 | 8.4 | <0.5 | 6.8 | 12.2 | 8.4 | 15.6 | 2.8 |
| 34 | EDDA. 10% DI Wash Water | " | SRA1 | 2000 (in water) | Top Oil Interface Water | | 2 2 8 | | 93 88 | 3 3 33 | 9.0 10.0 | 2 7 | 86 91 1300 |
| 35 | EDDA. 10% DI Wash Water | " | SI2 | 2000 (in water) | Top Oil Interface Water | | 6 5 11 | | 80 84 4 | 58 | 12.0 9.0 | 45 2 6 | 9 6 6 |

TABLE III-continued

EDDA Test Results, Examples 29-40

| 36 | EDDA. 10% DI Wash Water | "   | C     | 2000 (in water) | Top Oil Interface Water |    | 31 | 94 86 4   |       | 57 | 9.0 9.0 6 | 5 4 3   |
|----|-------------------------|-----|-------|-----------------|-------------------------|----|----|-----------|-------|----|-----------|---------|
| 37 | EDDA. 10% DI Wash Water | "   | SI3   | 2000 (in water) | Top Oil Interface Water | 5 5 13 |    | 82 95    | 13 13 |    | 9.0 10.0  | 14 7 7  | 215 223 50 |
| 38 | EDDA. 10% DI Wash Water | "   | Blank | none            | Oil                     | 8  |    | 48        | 13    |    | 8.0       | 37      | 3 |
| 39 | EDDA. 10% DI Wash Water | "   | SRA1  | 2000 (in water) | Top Oil Interface Water |    | 12 | 73 59    |       |    | 3.0 3.0   | 11 20 2 | 11 5 516 |
| 40 | EDDA. 10% DI Wash Water | "   | Blank | none            | Oil                     |    |    | 37        |       |    | 2.0       |         |   |

TABLE IV

EDDA Test Results, Examples 41-54

| Ex | Test Condition | Test Sample | Additive | Dose (ppm) | | Metals Analysis | | | | | | | |
|----|----|----|----|----|----|----|----|----|----|----|----|----|----|
| | | | | | | Na | K | Mg | Ca | Fe | Cu | Zn | Al |
| 41 | EDDA. 10% DI WW | Crude A | DA | 15 | Top Oil Water | 5.9 626 | 17.1 <5 | <3 17 | 371 210 | 58 <0.2 | <3 <0.2 | 36.0 <0.2 | 4.0 <0.2 |
| 42 | EDDA. 10% DI WW | " | DB | 15 | Top Oil Water | 5 705 | 13 <5 | <3 19 | 384 236 | 60 <0.2 | <3 <0.2 | 36.0 <0.2 | 5.0 <0.2 |
| 43 | EDDA. 10% DI WW | " | DC | 15 | Top Oil Water | 11 579 | 32 <5 | 5 15 | 443 193 | 88 <0.2 | <3 <0.2 | 38.0 <0.2 | 41.0 <0.2 |
| 44 | EDDA. 10% DI WW | " | DD | 15 | Top Oil Water | 8 698 | 27 <5 | <3 17 | 368 234 | 57 <0.2 | <3 <0.2 | 36.0 <0.2 | 4.0 <0.2 |
| 45 | EDDA. 10% DI WW | " | DE | 15 | Top Oil Water | 6 612 | 23 <5 | 3 16 | 366 204 | 55 <0.2 | <3 <0.2 | 35.0 <0.2 | 4.0 <0.2 |
| 46 | EDDA. 10% DI WW | " | Blank | None | Oil Water | 6 650 | 19 <5 | <3 18 | 361 216 | 54 <0.2 | <3 <0.2 | 35.0 <0.2 | <3 <0.2 |
| 47 | EDDA. 10% DI WW | Crude B | DA | 15 | Top Oil Water | 4 147 | <5 950 | <3 7 | 40 143 | 7 <0.2 | <3 <0.2 | 6.0 <0.2 | <3 <0.2 |
| 48 | EDDA. 10% DI WW | " | DB | 15 | Top Oil Water | 5 134 | <5 882 | <3 6 | 41 129 | 6 <0.2 | <3 <0.2 | 6.0 <0.2 | <3 <0.2 |
| 49 | EDDA. 10% DI WW | " | DC | 15 | Top Oil Water | 5 147 | <5 948 | <3 7 | 39 140 | 7 <0.2 | <3 <0.2 | 6.0 <0.2 | <3 <0.2 |
| 50 | EDDA. 10% DI WW | " | DD | 15 | Top Oil Water | 4 148 | <5 954 | <3 6 | 41 140 | 6 <0.2 | <3 <0.2 | 6.0 <0.2 | <3 <0.2 |
| 51 | EDDA. 10% DI WW | " | DE | 15 | 6 146 | <5 943 | <3 7 | 46 140 | 8 <0.2 | <3 <0.2 | 6.0 <0.2 | <3 <0.2 | |
| 52 | EDDA. 10% DI WW | " | Blank | none | Oil Water | 5 130 | <5 858 | <3 5 | 48 122 | 6 <0.2 | <3 <0.2 | 6.0 <0.2 | <3 <0.2 |
| 53 | EDDA. 10% DI WW | Crude C | C | 50 | Top Oil Interface Water | 3 4 690 | <1 <1 42 | <1 <1 31 | 4 3 174 | 2 5 124 | <1 <1 <1 | 1.0 1.0 6.0 | 1.0 1.0 2.0 |
| 54 | EDDA. 10% DI WW | " | Blank | none | Oil | 46 | 4 | 3 | 14 | 22 | <1 | 2.0 | 2.0 |

| Ex | Test Condition | Test Sample | Additive | Dose (ppm) | | Metals Analysis | | | | | | | |
|----|----|----|----|----|----|----|----|----|----|----|----|----|----|
| | | | | | | Sb | Ba | V | Pb | Mn | Ni | Si | P |
| 41 | EDDA. 10% DI WW | Crude A | DA | 15 | Top Oil Water | <3 <0.2 | 5 7 | <3 <0.2 | 27 <0.4 | 14 <0.2 | 10.0 <0.2 | 13 10 | 4 <0.2 |
| 42 | EDDA. 10% DI WW | " | DB | 15 | Top Oil Water | <3 <0.2 | 5 8 | <3 <0.2 | 22 <0.4 | 14 <0.2 | 10.0 <0.2 | 9 10 | 3 <0.2 |
| 43 | EDDA. 10% DI WW | " | DC | 15 | Top Oil Water | <3 <0.2 | 6 7 | <3 <0.2 | 33 <0.4 | 14 <0.2 | 11.0 <0.2 | 55 8 | 3 <0.2 |
| 44 | EDDA. 10% DI WW | " | DD | 15 | Top Oil Water | <3 <0.2 | 6 9 | <3 <0.2 | 33 <0.4 | 14 <0.2 | 10.0 <0.2 | 8 9 | 4 <0.2 |
| 45 | EDDA. 10% DI WW | " | DE | 15 | Top Oil Water | <3 <0.2 | 5 8 | <3 <0.2 | 21 <0.4 | 14 <0.2 | 10.0 <0.2 | 66 8 | <3 <0.2 |
| 46 | EDDA. 10% DI WW | " | Blank | None | Oil Water | <3 <0.2 | 5 8 | <3 <0.2 | 20 <0.4 | 13 <0.2 | 9.0 <0.2 | 8 9 | 3 <0.2 |
| 47 | EDDA. 10% DI WW | Crude B | DA | 15 | Top Oil Water | <3 <0.2 | <3 2 | 8 <0.2 | 24 <0.4 | <3 <0.2 | <3 <0.2 | 6 2 | <3 <0.2 |
| 48 | EDDA. 10% DI WW | " | DB | 15 | Top Oil Water | <3 <0.2 | <3 2 | 7 <0.2 | 17 <0.4 | <3 <0.2 | <3 <0.2 | 6 2 | <3 <0.2 |

TABLE IV-continued

EDDA Test Results, Examples 41-54

| | | | | | | | | | | | | | |
|---|---|---|---|---|---|---|---|---|---|---|---|---|---|
| 49 | EDDA. 10% DI WW | " | DC | 15 | Top Oil Water | <3 <0.2 | <3 1 | 7 <0.2 | 21 0.4 | <3 <0.2 | <3 <0.2 | 4 3 | <3 <0.2 |
| 50 | EDDA. 10% DI WW | " | DD | 15 | Top Oil Water | <3 <0.2 | <3 1 | 7 <0.2 | 21 0.4 | <3 <0.2 | <3 <0.2 | 3 3 | <3 <0.2 |
| 51 | EDDA. 10% DI WW | " | DE | 15 | 6 146 | <3 1 | 8 <0.2 | 22 0.4 | <3 <0.2 | <3 <0.2 | 10 3 | <3 <0.2 | |
| 52 | EDDA. 10% DI WW | " | Blank | none | Oil Water | <3 <0.2 | <3 1 | 8 <0.2 | 23 0.5 | <3 <0.2 | <3 <0.2 | 6 3 | <3 <0.2 |
| 53 | EDDA. 10% DI WW | Crude C | C | 50 | Top Oil Interface Water | <1 <1 <1 | <1 <1 2 | 12 12 <1 | <1 <1 <1 | <1 <1 <1 | 6.0 6.0 <1 | 3 3 2 | 3 3 2 |
| 54 | EDDA. 10% DI WW | " | Blank | none | Oil | <1 | <1 | 11 | <1 | <1 | 6.0 | 4 | 4 |

TABLE V

EDDA Test Results, Examples 55-67

| Ex | Test Condition | Test Sample | Additive | Dose (ppm) | | Na | K | Mg | Ca | Fe | Cu | Zn | Al |
|---|---|---|---|---|---|---|---|---|---|---|---|---|---|
| | | | | | | | | Metals Analysis | | | | | |
| 55 | EDDA. 4% DI WW | Crude D/G Blend | DA/D | 15/50 | Top Oil Water | 6 338 | 29 | 3 40 | 225 383 | 29 0.2 | 3 <0.1 | 15.0 <0.1 | 4.0 <0.1 |
| 56 | EDDA. 4% DI WW | Crude D/G Blend | DE/D | 15/50 | Top Oil Water | 6 341 | 30 | 4 34 | 249 388 | 32 0.2 | 4 <0.1 | 15.0 <0.1 | 3.0 <0.1 |
| 57 | EDDA. 4% DI WW | Crude D/G Blend | DB/D | 15/50 | Top Oil Water | 11 334 | 76 | 4 35 | 244 375 | 30 0.1 | 5 <0.1 | 14.0 <0.1 | 2.0 <0.1 |
| 58 | EDDA. 4% DI WW | Crude D/G Blend | DA/D | 25/50 | Top Oil Water | 8 339 | 30 | 2 39 | 216 382 | 26 0.2 | 7 <0.1 | 15.0 <0.1 | 3.0 <0.1 |
| 59 | EDDA. 4% DI WW | Crude D/G Blend | DE/D | 25/50 | Top Oil Water | 338 | | 37 | 380 | 0.2 | <0.1 | <0.1 | <0.1 |
| 60 | EDDA. 4% DI WW | Crude D/G Blend | DB/D | 25/50 | Top Oil Water | 13 345 | 33 | 1 37 | 206 386 | 26 0.3 | 14 <0.1 | 15.0 <0.1 | 2.0 <0.1 |
| 61 | EDDA. 4% DI WW | Crude D/G Blend | Blank | None | Oil | 44 | 930 | 11 | 266 | 33 | 2 | 15.0 | 4.0 |
| 62 | EDDA. 4% DI WW | Crude D/G Blend | DA/D | 40/50 | Top Oil Water | 30 155 | 20 | 4 18 | 194 142 | 29 <0.1 | 4 <0.1 | 12.0 <0.1 | 4.0 <0.1 |
| 63 | EDDA. 4% DI WW | Crude D/G Blend | DE/D | 40/50 | Top Oil Water | 6 341 | 25 | 4 39 | 205 292 | 28 0.2 | 3 <0.1 | 13.0 <0.1 | 5.0 <0.1 |
| 64 | EDDA. 4% DI WW | Crude D/G Blend | DB/D | 40/50 | Top Oil Water | 8 336 | 26 | 4 34.2 | 224 287 | 31 0.2 | 8 <0.1 | 17.0 <0.1 | 6.0 0.2 |
| 65 | EDDA. 4% DI WW | Crude D/G Blend | DF/D | 40/50 | Top Oil Water | 8 352 | 43 | 6 33.7 | 230 297 | 36 0.2 | 4 <0.1 | 19.0 <0.1 | 11.0 0.2 |
| 66 | EDDA. 4% DI WW | Crude D/G Blend | DD/D | 40/50 | Top Oil Water | 8 344 | 67 | 8 33 | 250 386 | 34 0.2 | 3 <0.1 | 21.0 0.2 | 10.0 1.0 |
| 67 | EDDA. 4% DI WW | Crude D/G Blend | DC/D | 40/50 | Top Oil Water | 7 352 | 33 | 5 33.2 | 211 300 | 34 0.2 | 4 <0.1 | 14.0 0.2 | 10.0 <0.5 |

| Ex | Test Condition | Test Sample | Additive | Dose (ppm) | | Sb | Ba | V | Pb | Mn | Ni | Si | P |
|---|---|---|---|---|---|---|---|---|---|---|---|---|---|
| | | | | | | | | Metals Analysis | | | | | |
| 55 | EDDA. 4% DI WW | Crude D/G Blend | DA/D | 15/50 | Top Oil Water | <0.1 | 5 17.5 | | | 11 1.1 | 8.0 <0.1 | 2 8.1 | 11 <0.1 |
| 56 | EDDA. 4% DI WW | Crude D/G Blend | DE/D | 15/50 | Top Oil Water | <0.1 | 5 17.4 | | | 12 1.1 | 10.0 <0.1 | 3 7.1 | <1 <0.1 |
| 57 | EDDA. 4% DI WW | Crude D/G Blend | DB/D | 15/50 | Top Oil Water | <0.1 | 5 17.3 | | | 12 1.1 | 8.0 <0.1 | 2 8 | 6 <0.1 |
| 58 | EDDA. 4% DI WW | Crude D/G Blend | DA/D | 25/50 | Top Oil Water | <0.1 | 5 18.6 | | | 11 1.2 | 7.0 <0.1 | <1 9.6 | 9 <0.1 |
| 59 | EDDA. 4% DI WW | Crude D/G Blend | DE/D | 25/50 | Top Oil Water | <0.1 | 19 | | | 1.1 | <0.1 | 8 | <0.1 |
| 60 | EDDA. 4% DI WW | Crude D/G Blend | DB/D | 25/50 | Top Oil Water | <0.1 | 5 19 | | | 10 1.2 | 6.0 <0.1 | 1 8.9 | 8 <0.1 |
| 61 | EDDA. 4% DI WW | Crude D/G Blend | Blank | None | Oil | | 7 | | | 11 | 6.0 | 3 | 9 |
| 62 | EDDA. 4% DI WW | Crude D/G Blend | DA/D | 40/50 | Top Oil Water | 3 <0.1 | 4 6.8 | | | 9 0.6 | 3.0 <0.1 | 5 3.5 | 14 114 |
| 63 | EDDA. 4% DI WW | Crude D/G Blend | DE/D | 40/50 | Top Oil Water | 2 <0.1 | 5 13.6 | | | 10 1.1 | 3.0 <0.1 | 5 6.9 | 15 180 |
| 64 | EDDA. 4% DI WW | Crude D/G Blend | DB/D | 40/50 | Top Oil Water | <1 <0.1 | 5 13.4 | | | 10 1.1 | 5.0 <0.1 | 2 7.1 | 18 180 |
| 65 | EDDA. 4% DI WW | Crude D/G Blend | DF/D | 40/50 | Top Oil Water | <1 <0.1 | 5 13.6 | | | 11 1 | 6.0 <0.1 | 3 6.8 | 18 187 |

TABLE V-continued

EDDA Test Results, Examples 55-67

| | | | | | | | | | | | |
|---|---|---|---|---|---|---|---|---|---|---|---|
| 66 | EDDA. 4% DI WW | Crude D/G Blend | DD/D | 40/50 | Top Oil Water | <1 <0.1 | 6 13.4 | 12 1 | 8.0 <0.1 | 4 6.7 | 27 177 |
| 67 | EDDA. 4% DI WW | Crude D/G Blend | DC/D | 40/50 | Top Oil Water | <1 <0.1 | 5 13.6 | 10 1.1 | 4.0 <0.1 | 4 6.7 | 14 183 |

TABLE VI

EDDA Test Results, Examples 68-83

| Ex | Test Condition | Test Sample | Additive | Dose (ppm) | | Metals Analysis | | | | | | | |
|---|---|---|---|---|---|---|---|---|---|---|---|---|---|
| | | | | | | Na | K | Mg | Ca | Fe | Cu | Zn | Al |
| 68 | EDDA. 7.5% DI WW | Crude E | Blank | None | Oil | 63 | 1590 | 12.2 | 475 | 23.8 | 0.5 | 13.0 | 0.6 |
| 69 | EDDA. 7.5% DI WW | " | DA/E | 30/70 | Top Oil Water | 6.1 212 | 20.5 2960 | 7.8 25 | 482 278 | 25 0.7 | 0.8 <0.1 | 14.5 0.1 | 2.1 4.0 |
| 70 | EDDA. 7.5% DI WW | " | DE/E | 30/70 | Top Oil Water | 5.6 215 | 17.7 2990 | 7.4 27 | 435 281 | 25.2 0.7 | 0.6 <0.1 | 14.7 <0.1 | 0.5 0.1 |
| 71 | EDDA. 7.5% DI WW | " | DB/E | 30/70 | Top Oil Water | 6 218 | 17.2 3020 | 7.7 25.9 | 420 283 | 24 0.6 | 0.8 <0.1 | 15.1 <0.1 | 0.2 <0.1 |
| 72 | EDDA. 7.5% DI WW | " | DF/E | 30/70 | Top Oil Water | 6.2 229 | 19.6 3140 | 7.5 29.2 | 485 298 | 24.8 0.6 | 0.8 0.2 | 14.7 <0.1 | 0.6 <0.1 |
| 73 | EDDA. 7.5% DI WW | " | DD/E | 30/70 | Top Oil Water | 7 230 | 18.5 3160 | 6.6 28.2 | 415 301 | 24.5 0.6 | 0.4 <0.1 | 14.5 <0.1 | <0.4 <0.1 |
| 74 | EDDA. 7.5% DI WW | " | DC/E | 30/70 | Top Oil Water | 6 227 | 24.6 3170 | 7.6 28.1 | 398 293 | 23.4 0.7 | <0.4 <0.1 | 15.0 <0.1 | <0.4 <0.1 |
| 75 | EDDA 5.0% DI Wash W. | Crude G | acetic acid | 1000 (in water) | Top Oil Water | <0.4 116 | 12.6 2430 | 2.5 56.1 | 22.6 3350 | 25.2 72.1 | 0.9 0.5 | 10.6 43.9 | 2.1 <0.1 |
| 76 | EDDA 5.0% DI Wash W. | Crude F | F | 1000 (in water) | Top Oil Water | 0.8 113 | 7 2430 | 3.9 48.3 | 190 914 | 31.8 4.6 | 0.7 <0.1 | 15.2 0.7 | 3.0 <0.1 |
| 77 | EDDA 5.0% DI Wash W. | Blend E | Blank | None | Oil | 11 | 320 | 3.3 | 100 | 11.3 | 0.4 | 4.2 | 1.1 |
| 78 | EDDA 5.0% DI Wash W. | +Other Crude | acetic acid | 1000 (in water) | Top Oil Water | 1.4 146 | 7.7 3280 | 1.2 29.7 | 21.5 844 | 3.5 96 | <0.4 0.2 | 13.8 44.9 | 9.9 0.2 |
| 79 | EDDA 5.0% DI Wash W. | 30/70 Refinery Blend | F | 1000 (in water) | Top Oil Water | 3 140 | 1.2 3170 | 1 29.3 | 24.7 408 | 1.1 118 | <0.4 <0.1 | 0.6 52.4 | 1.0 2.2 |
| 80 | EDDA 5.0% DI Wash W. | " | lactic acid | 1000 (in water) | Top Oil Water | 2.5 121 | 25.6 2700 | 1.3 24.1 | 32.2 620 | 2 92.5 | 0.6 0.3 | 1.1 37.2 | 1.0 0.7 |
| 81 | EDDA 5.0% DI Wash W. | " | glycolic acid | 1000 (in water) | Top Oil Water | 2.4 124 | 22.9 2830 | 1.2 25.2 | 25.9 700 | 2.7 92.2 | <0.4 0.3 | 0.9 38.2 | 1.5 0.6 |
| 82 | EDDA 5.0% DI Wash W. | " | SI1 | 1000 (in water) | Top Oil Water | 2 958 | 7.9 3950 | 1.9 14.3 | 75 301 | 11.1 1.4 | 0.5 0.3 | 5.0 0.6 | 1.1 0.3 |
| 83 | EDDA 5.0% DI Wash W. | " | Oxalic acid | 1000 (in water) | Top Oil Water | 6.6 132 | 21.9 2970 | 2.5 20.38 | 80 7.4 | 11.4 <0.1 | 0.5 <0.1 | 4.7 <0.1 | 1.0 <0.1 |

| Ex | Test Condition | Test Sample | Additive | Dose (ppm) | | Metals Analysis | | | | | | | |
|---|---|---|---|---|---|---|---|---|---|---|---|---|---|
| | | | | | | Sb | Ba | V | Pb | Mn | Ni | Si | P |
| 68 | EDDA. 7.5% DI WW | Crude E | Blank | None | Oil | <0.4 | 11 | <0.4 | <0.4 | 10.4 | 10.6 | 3.9 | 2.9 |
| 69 | EDDA. 7.5% DI WW | " | DA/E | 30/70 | Top Oil Water | <0.4 <0.1 | 9.2 19.3 | <0.4 <0.4 | <0.4 <0.1 | 11.3 1.3 | 13.2 0.5 | 5.3 7.1 | 26.2 291 |
| 70 | EDDA. 7.5% DI WW | " | DE/E | 30/70 | Top Oil Water | <0.4 <0.1 | 9.4 19.3 | <0.4 <0.4 | <0.4 <0.1 | 11.6 1.3 | 13.6 0.4 | 2.4 7.1 | 25.5 297 |
| 71 | EDDA. 7.5% DI WW | " | DB/E | 30/70 | Top Oil Water | <0.4 <0.1 | 8.6 19.8 | <0.4 <0.4 | <0.4 <0.1 | 11.3 1.3 | 13.8 0.7 | 3.4 7.5 | 27.2 294 |
| 72 | EDDA. 7.5% DI WW | " | DF/E | 30/70 | Top Oil Water | <0.4 <0.1 | 9.4 19.8 | <0.4 <0.4 | <0.4 <0.1 | 11.4 1.3 | 14.2 0.9 | 2.6 7.3 | 25.3 313 |
| 73 | EDDA. 7.5% DI WW | " | DD/E | 30/70 | Top Oil Water | <0.4 <0.1 | 8.9 20.1 | <0.4 <0.4 | <0.4 <0.1 | 11.3 1.3 | 13.6 0.6 | 3 7.4 | 26.6 317 |
| 74 | EDDA. 7.5% DI WW | " | DC/E | 30/70 | Top Oil Water | <0.4 <0.1 | 8.4 20.3 | <0.4 <0.1 | <0.4 <0.1 | 10.9 1.4 | 14.8 0.8 | 4 7.8 | 29.2 302 |
| 75 | EDDA 5.0% DI Wash W. | Crude G | acetic acid | 1000 (in water) | Top Oil Water | <0.4 0.2 | 0.6 84.4 | <0.4 <0.1 | <0.4 0.2 | 2.5 126 | 11.6 0.5 | 1.1 5.4 | 4.2 0.3 |
| 76 | EDDA 5.0% DI Wash W. | Crude F | F | 1000 (in water) | Top Oil Water | <0.4 <0.1 | 3.9 44.5 | <0.4 <0.1 | <0.4 <0.1 | 12.8 6.4 | 11.7 <0.1 | 2.4 6.1 | 4 0.1 |
| 77 | EDDA 5.0% DI Wash W. | Blend E | Blank | None | Oil | <0.4 | 2.5 | <0.4 | <0.4 | 4.1 | 3.5 | 0.7 | 1.5 |
| 78 | EDDA 5.0% DI Wash W. | +Other Crude | acetic acid | 1000 (in water) | Top Oil Water | <0.4 <0.1 | 0.9 14.8 | <0.1 <0.4 | <0.4 0.3 | <0.4 44.4 | 4.1 0.7 | 1.3 4 | 2.2 0.3 |
| 79 | EDDA 5.0% DI Wash W. | 30/70 Refinery | F | 1000 (in water) | Top Oil Water | <0.4 <0.1 | 0.6 4.2 | <0.1 <0.4 | <0.4 <0.1 | <0.4 38.8 | 4.0 0.5 | <0.4 4.9 | 2.1 0.6 |

TABLE VI-continued

EDDA Test Results, Examples 68-83

| 80 | EDDA 5.0% DI Wash W. | Blend | lactic acid | 1000 (in water) | Top Oil Water | <0.4 0.1 | 0.9 10.3 | <0.1 <0.4 | <0.4 0.7 | 1.2 25.8 | 3.9 36.3 | 1.8 5 | 2 0.7 |
| 81 | EDDA 5.0% DI Wash W. | " | glycolic acid | 1000 (in water) | Top Oil Water | <0.4 0.2 | 0.8 9.8 | <0.1 <0.4 | <0.4 0.9 | 1.1 27.6 | 3.9 30.7 | 2.6 4.2 | 2.2 0.6 |
| 82 | EDDA 5.0% DI Wash W. | " | SI1 | 1000 (in water) | Top Oil Water | <0.4 <0.1 | 1.7 12.6 | <0.1 <0.4 | <0.4 <0.1 | 4.2 3.4 | 3.8 <0.1 | <0.4 5.4 | 1.9 0.1 |
| 83 | EDDA 5.0% DI Wash W. | " | Oxalic acid | 1000 (in water) | Top Oil Water | <0.4 <0.1 | 1.6 5.2 | <0.1 <0.4 | <0.4 <0.1 | 4.2 0.7 | 3.9 <0.1 | <0.4 5 | 2.3 <0.1 |

The FIGURE presents a graph showing the partitioning across desalters of various amines and ammonia as a function of pH. The addition of water-soluble hydroxyacids of this invention such as glycolic and gluconic acid to the desalter wash water at the use rates specified herein will reduce the water's pH to the range of about 3-6.5.

In the foregoing specification, the invention has been described with reference to specific embodiments thereof, and has been demonstrated as effective in transferring metals, e.g. calcium, potassium, etc., and/or amines from crude oil to the aqueous phase in bench scale desalting testing, as non-limiting examples. However, it will be evident that various modifications and changes can be made thereto without departing from the broader spirit or scope of the invention as set forth in the appended claims. Accordingly, the specification is to be regarded in an illustrative rather than a restrictive sense. For example, specific water-soluble hydroxyacids, and combinations thereof with other mineral acids, other than those specifically exemplified or mentioned, or in different proportions, falling within the claimed parameters, but not specifically identified or tried in a particular application to transfer metals and/or amines into the aqueous phase, are within the scope of this invention. Similarly, it is expected that the inventive compositions will find utility as metal transfer compositions for other fluids besides crude oil emulsions.

What is claimed is:

1. A method of transferring metals and/or amines from a hydrocarbon phase to a water phase in a refinery desalting process consisting of:
   adding to a wash water, an effective amount of a composition to transfer metals and/or amines from a hydrocarbon phase to a water phase, the composition comprising:
      at least one water-soluble corrosion inhibitor, and
      at least one water-soluble hydroxyacid selected from the group consisting of glycolic acid, gluconic acid, citric acid, $C_2$-$C_4$ alpha-hydroxy acids, malic acid, lactic acid, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof;
   lowering the pH of the wash water to 6 or below, before, during and/or after adding the composition;
   adding the wash water to crude oil to create an emulsion; and
   resolving the emulsion into hydrocarbon phase and an aqueous phase using electrostatic coalescence, where at least a portion of the metals and/or amines are transferred to the aqueous phase.

2. The method of claim 1 where in the adding of the composition, the composition further comprises down to about 1 wt.% water-soluble hydroxyacid.

3. The method of claim 1 where in the adding of the composition, the water-soluble hydroxyacid is present in the emulsion in an amount ranging from about 1 to about 2000 ppm.

4. The method of claim 1 where in the adding of the composition, the composition further comprises water or alcohol solvent.

5. The method of claim 1 where the composition additionally comprises at least one additional component selected from the group consisting of a water or alcohol solvent, a demulsifier, a scale inhibitor, metal chelants, wetting agents and mixtures thereof.

6. The method of claim 1 where the composition additionally comprises at least one demulsifier.

7. A method of transferring metals and/or amines from a hydrocarbon phase to a water phase in a refinery desalting process consisting of:
   adding to a wash water, an effective amount of a composition to transfer metals and/or amines from a hydrocarbon phase to a water phase, the composition comprising:
      at least one water-soluble corrosion inhibitor;
      at least one demulsifier; and
      at least one water-soluble hydroxyacid selected from the group consisting of glycolic acid, gluconic acid, citric acid, $C_2$-$C_4$ alpha-hydroxy acids, malic acid, lactic acid, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof, where the water-soluble hydroxyacid comprises from about 1 to about 85 wt.% of the composition and the composition further comprises a water or alcohol solvent;
   lowering the pH of the wash water to 6 or below, before, during and/or after adding the composition;
   adding the wash water to crude oil to create an emulsion; and
   resolving the emulsion into hydrocarbon phase and an aqueous phase using electrostatic coalescence, where at least a portion of the metals and/or amines are transferred to the aqueous phase.

8. A composition for transferring metals and/or amines from a hydrocarbon phase to a water phase consisting of:
   water;
   a water-soluble hydroxyacid selected from the group consisting of glycolic acid, gluconic acid, citric acid, $C_2$-$C_4$ alpha-hydroxy acids, malic acid, lactic acid, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof;

at least one water-soluble corrosion inhibitor; and
at least one demulsifier;
where the pH of the composition is 6 or below.

9. The composition of claim 8 where the composition further comprises down to about 1 wt.% water-soluble hydroxyacid.

10. The composition of claim 8 where the water-soluble hydroxyacid comprises from about 1 to about 85 wt% of the composition.

11. A treated hydrocarbon crude oil emulsion consisting of:
crude oil;
a composition for transferring metals and/or amines from a hydrocarbon phase to a water phase comprising a water-soluble hydroxyacid selected from the group consisting of glycolic acid, gluconic acid, citric acid, $C_2$-$C_4$ alpha-hydroxy acids, malic acid, lactic acid, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof;
wash water where the pH of the wash water is 6 or below;
at least one water-soluble corrosion inhibitor; and
at least one additional component selected from the group consisting of a water or alcohol solvent, a demulsifier, a scale inhibitor, metal chelants, wetting agents and mixtures thereof.

12. The treated crude oil emulsion of claim 11 where the composition further comprises down to about 1 wt.% water-soluble hydroxyacid.

13. The treated crude oil emulsion of claim 11 where the water-soluble hydroxyacid is present in the emulsion in an amount ranging from about 1 to about 2000 ppm.

14. The treated crude oil emulsion of claim 11 where the crude oil contains more than 10 ppm iron or calcium.

15. The treated crude oil emulsion of claim 11 where the at least one additional component is at least one demulsifer.

* * * * *